(12) United States Patent
Bamford et al.

(10) Patent No.: US 8,204,912 B2
(45) Date of Patent: Jun. 19, 2012

(54) INSERTION RATE AWARE B-TREE

(75) Inventors: Roger I. Bamford, Woodside, CA (US); Amit Ganesh, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1095 days.

(21) Appl. No.: 11/517,686

(22) Filed: Sep. 8, 2006

(65) Prior Publication Data

US 2008/0065672 A1 Mar. 13, 2008

(51) Int. Cl.
*G06F 7/00* (2006.01)
(52) U.S. Cl. .................................... 707/797
(58) Field of Classification Search ............... 707/102, 707/797
See application file for complete search history.

(56) References Cited

U.S. PATENT DOCUMENTS

| | | | |
|---|---|---|---|
| 7,191,304 B1 * | 3/2007 | Cameron et al. ............ | 711/202 |
| 2002/0194015 A1 * | 12/2002 | Gordon et al. ............... | 705/1 |
| 2004/0133747 A1 * | 7/2004 | Coldewey .................... | 711/137 |
| 2006/0101081 A1 * | 5/2006 | Lin et al. ..................... | 707/200 |

OTHER PUBLICATIONS

B-tree algorithms, Semaphore Corporation, available online at: www.semaphorecorp.com/btp/algo.html (first available Jul. 9, 1997).*

Lomet, A Simple Bounded Disorder File Organization with Good Performance, ACM Transactions on Database Systems, vol. 13 No. 4, pp. 525-551, Dec. 4, 1988.*

Jermain et al., A Novel Index Supporting High Volume Data Warehouse Insertions, Proceedings of the 25th VLDB Conference (1999).*

Rao et al., Making B+-Trees Cache Conscious in Main Memory, MOD 200 ACM, pp. 475-486, available online at http://delivery.acm.org/10.1145/340000/335449/p475-rao.pdf?ip=151.207.246.4&CFID=41424335&CFTOKEN=23006458&_acm_=1315600886_01b0124a4d466714c6cd6665501c556d (published in 2000).*

Litwin, et al., A New Method for Fast Data Searches With Keys, IEEE Software. 4, 2 (Mar. 1987), pp. 16-24.

* cited by examiner

*Primary Examiner* — Jensen Hu
(74) *Attorney, Agent, or Firm* — Kraguljac Law Group LLC

(57) ABSTRACT

Systems, methods, and other embodiments associated with insertion rate responsive b-trees are described. One system embodiment includes a capacity logic to detect a divide condition for a leaf node and an insert logic to determine an insertion level for the leaf node. The system embodiment may include an allocation logic to selectively allocate a set of leaf nodes. Characteristics of the set (e.g., number of members) may depend on the divide condition and the insertion level. The system embodiment may include a partition logic to move a partition key from the leaf node to a parent and to associate the partition key with the set of leaf nodes. A fuzzy index logic may provide key-based addressing to the set of leaf nodes.

21 Claims, 9 Drawing Sheets

INSERTION RATE AWARE B-TREE

BACKGROUND

In computer science, a b-tree is a type of tree data structure. Unlike a binary tree where each node has exactly two children, a b-tree node may have a variable number of children. The number of children may vary within a range defined for the b-tree.

B-trees are used in applications including databases, file systems, and so on. Thus, a b-tree child node may store, for example, a key and a row identifier. In one example, the entries in a b-tree child node may be arranged in order by key value. In the example, each key in a non-child node (e.g., branch block) has an associated child node that is the root of a sub-tree containing nodes with keys less than or equal to the key but greater than the preceding key. A node may also have an additional right-most child that is the root for a sub-tree containing all keys greater than any keys in the node.

As data is inserted into a b-tree, a node may become full. Thus a node may be split to accommodate subsequent data insertions. Prior Art FIG. 1 illustrates an example of this splitting. At time $T_0$, a b-tree may include a root node 100 that has a child node 110. Child node 110 may itself have two child nodes (e.g., a child node 120, a child node 130). At time $T_0$ it may be determined that an insertion has caused the child node 130 to become full. Thus, at time $T_1$, a median key 135 may be identified in the child node 130. At time $T_2$, the median key 135 may be relocated to the node 110 and an additional child node 140 may be allocated and linked to the b-tree. A subset (e.g., half) of the keys that appeared in the child node 130 at time $T_1$ will be located in the child node 130 at time $T_2$. For example, keys with values less than that of the median key 135 may be located in the child node 130. Similarly, a subset (e.g., half) of the keys that appeared in the node 130 at time $T_1$ will be located in the child node 140 at time $T_2$. For example, keys with values greater than or equal to that of the median key 135 may be located in the child node 140 at time $T_2$.

At certain times a b-tree may develop a "hot-spot". A hot-spot describes a region (e.g., leaf node) that is experiencing a level of insertion activity that creates contention issues and/or other issues. For example, consider an online transaction processing system (OLTP) that handles transactions having sequentially increasing order numbers that are used as a key/index. When the OLTP experiences a certain level of activity, the rightmost block may become a hot-spot because an undesirable level of insertion activity may be focused in that rightmost block. Under these conditions, performing an operation like a split may lead to undesirable performance. While a rightmost block is identified, it is to be appreciated that other nodes may become hot-spots under other conditions.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some embodiments one element may be designed as multiple elements, multiple elements may be designed as one element, an element shown as an internal component of another element may be implemented as an external component and vice versa, and so on. Furthermore, elements may not be drawn to scale.

Prior Art

DETAILED DESCRIPTION

Figure 1:
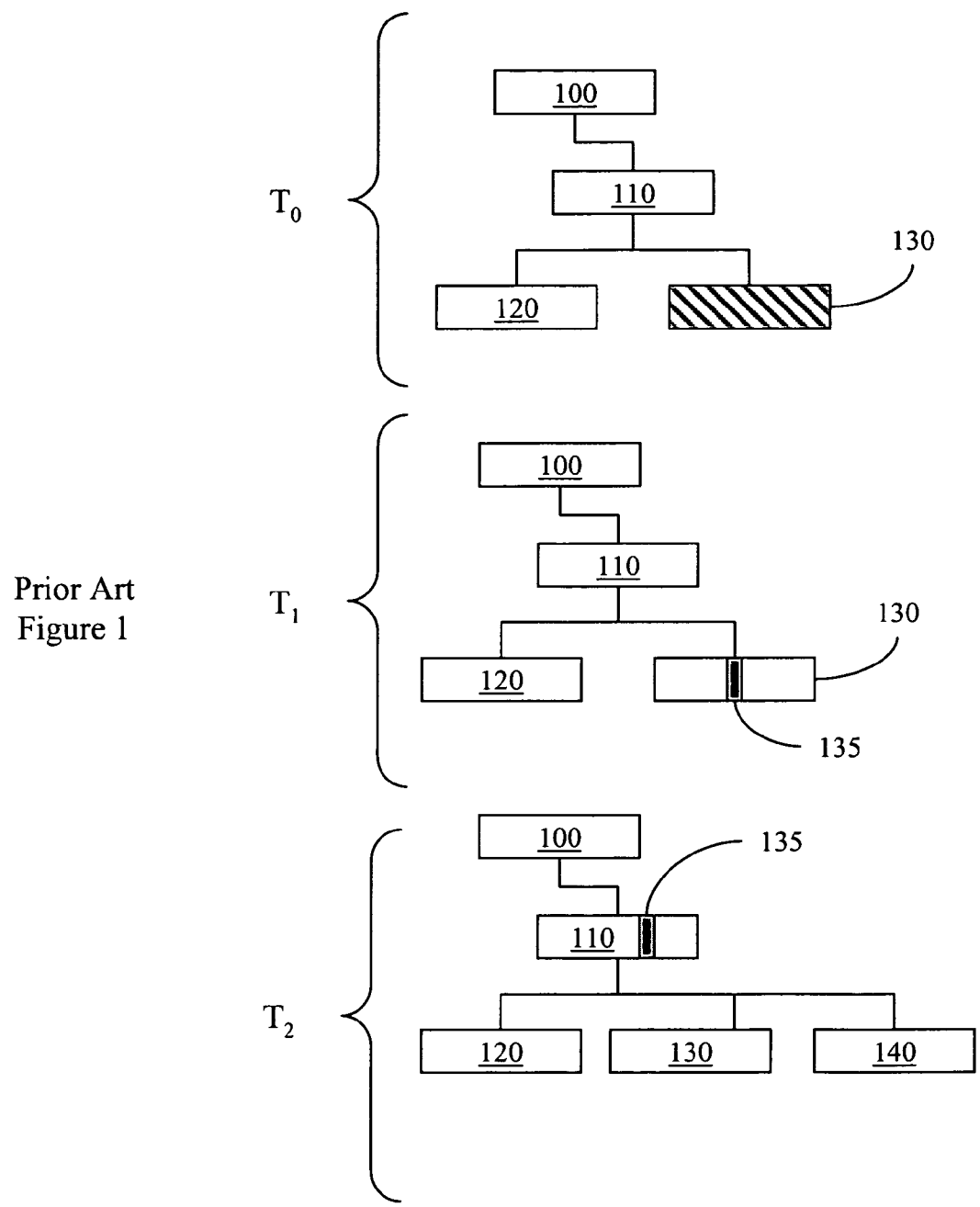
FIG. 1 illustrates conventional b-tree splitting.

Example systems and methods concern an insertion-rate sensitive b-tree. Insertion-rate sensitivity may be provided by replacing conventional two way node splitting with n-way node splitting (n being an integer greater than one). The n-way node splitting facilitates providing a fuzzy index to distribute hot-spot access and thus cool off that hot spot. Instead of splitting a full node into two half full nodes, example systems and methods may "hi-split" a node, leaving a full to nearly full node behind and empty to nearly empty node(s) ahead. Example system and methods may also allocate n physical nodes instead of one additional physical nodes. To facilitate cooling off the hot-spot (e.g., reducing an insertion rate per node), the n physical nodes may be treated as a single logical node but may have key-based access moderated by a hash function that distributes accesses for the single logical node between the n physical nodes.

In one example, whether n-way splitting occurs depends on if the node to be split is a hot-spot. A hot-spot may be detected, for example, by examining the insertion activity associated with the node. In one example, the breadth of the n-way splitting may depend on the degree to which the insertion activity indicates a hot-spot. For example, a first node identified as having a first level of insertion activity may cause a first n-way split (e.g., n=five), while a second node identified as having a second higher level of insertion activity may cause a second n-way split (e.g., n=ten).

The following includes definitions of selected terms employed herein. The definitions include various examples and/or forms of components that fall within the scope of a term and that may be used for implementation. The examples are not intended to be limiting. Both singular and plural forms of terms may be within the definitions.

"Machine-readable medium", as used herein, refers to a medium that participates in directly or indirectly providing signals, instructions and/or data that can be read by a machine (e.g., computer). A machine-readable medium may take forms, including, but not limited to, non-volatile media (e.g., optical disk, magnetic disk), volatile media (e.g., semiconductor memory, dynamic memory), and transmission media (e.g., coaxial cable, copper wire, fiber optic cable, electromagnetic radiation). Common forms of machine-readable mediums include floppy disks, hard disks, magnetic tapes, RAM (Random Access Memory), ROM (Read Only Memory), CD-ROM (Compact Disk ROM), and so on.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, a disk, and so on. In different examples a data store may reside in one logical and/or physical entity and/or may be distributed between multiple logical and/or physical entities.

"Logic", as used herein, includes but is not limited to hardware, firmware, software stored on a machine-readable medium, and/or combinations thereof to perform a function(s) or an action(s), and/or to cause a function or action from another logic, method, and/or system. Logic may include a software controlled microprocessor, discrete logic (e.g., application specific integrated circuit (ASIC)), an analog circuit, a digital circuit, a programmed logic device, a memory device containing instructions, and so on. Logic may include a gate(s), a combinations of gates, other circuit components, and so on. In some examples, logic may be fully embodied as software stored in a machine-readable medium. Where multiple logical logics are described, it may be possible in some examples to incorporate the multiple logical logics into one physical logic. Similarly, where a single logical logic is described, it may be possible in some examples to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more computer instructions and/or processor instructions that can be read, interpreted, compiled, and/or executed by a computer and/or processor. Software causes a computer, processor, or other electronic device to perform functions, actions and/or behave in a desired manner. Software may be embodied in various forms including routines, modules, methods, threads, and/or programs. In different examples software may be embodied in separate applications and/or code from dynamically linked libraries. In different examples, software may be implemented in executable and/or loadable forms including, but not limited to, a stand-alone program, an object, a function (local and/or remote), a servelet, an applet, instructions stored in a memory, part of an operating system, and so on. In different examples, computer-readable and/or executable instructions may be located in one logic and/or distributed between multiple communicating, co-operating, and/or parallel processing logics and thus may be loaded and/or executed in serial, parallel, massively parallel and other manners.

Suitable software for implementing various components of example systems and methods described herein may be developed using programming languages and tools (e.g., Java, C, C#, C++, SQL, APIs, SDKs, assembler). Software, whether an entire system or a component of a system, may be embodied as an article of manufacture and maintained or provided as part of a machine-readable medium. Software may include signals that transmit program code to a recipient over a network or other communication medium.

"User", as used herein, includes but is not limited to, one or more persons, software, computers or other devices, or combinations of these.

Some portions of the detailed descriptions that follow are presented in terms of method descriptions and representations of operations on electrical and/or magnetic signals capable of being stored, transferred, combined, compared, and otherwise manipulated in hardware. These are used by those skilled in the art to convey the substance of their work to others. An method is here, and generally, conceived to be a sequence of operations that produce a result. The operations may include physical manipulations of physical quantities. The manipulations may produce a transitory physical change like that in an electromagnetic transmission signal.

It has proven convenient at times, principally for reasons of common usage, to refer to these electrical and/or magnetic signals as bits, values, elements, symbols, characters, terms, numbers, and so on. These and similar terms are associated with appropriate physical quantities and are merely convenient labels applied to these quantities. Unless specifically stated otherwise, it is appreciated that throughout the description, terms including processing, computing, calculating, determining, displaying, automatically performing an action, and so on, refer to actions and processes of a computer system, logic, processor, or similar electronic device that manipulates and transforms data represented as physical (electric, electronic, magnetic) quantities.

Figure 2:
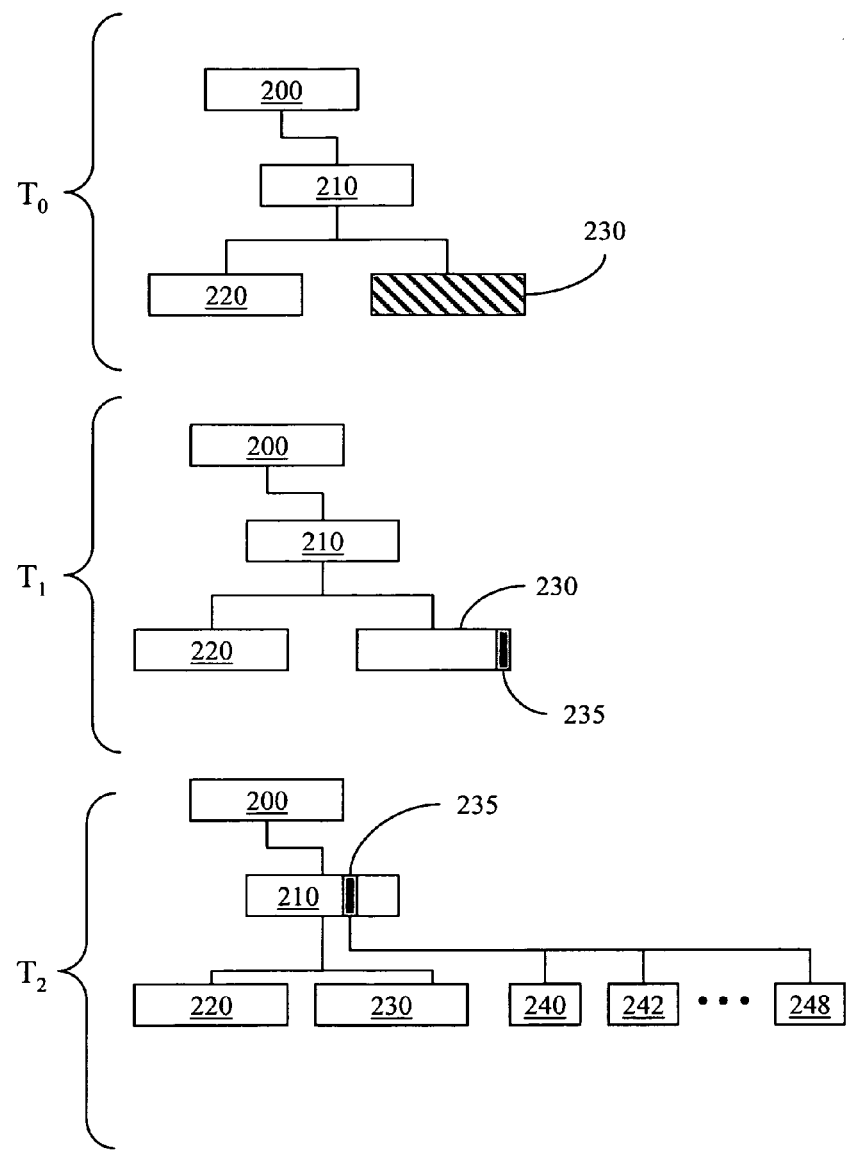
FIG. 2 illustrates an example of insertion rate aware b-tree splitting.

While Prior Art FIG. 1 illustrates conventional b-tree splitting, FIG. 2 illustrates an example of insertion rate aware b-tree splitting. As data is inserted into a b-tree, a node may become full. Thus a node may be split n ways (n being an integer greater than one) to accommodate insertions. At time $T_0$, a b-tree may include a root node 200 that has a child node 210. Child node 210 may itself have two child nodes (e.g., a child node 220, a child node 230). At time $T_0$ it may be determined that an insertion has caused the child node 230 to become full. Thus, at time $T_1$, a hi-split key 235 may be identified in the child node 230. The hi-split key may be positioned to create an unequal partition. Thus, in one example, a full or substantially full leaf node may be left behind while a newly allocated leaf node(s) may be empty or substantially empty.

At time $T_2$, the hi-split key 235 may be relocated to the node 210 and an additional set of child nodes (e.g., 240, 242, ... 248) may be allocated and linked to the b-tree. Depending on the location of the hi-split key 235, substantially all keys that appeared in the child node 230 at time $T_1$ will be located in the child node 230 at time $T_2$. Thus, child nodes 240 through 248 may be substantially empty at time $T_2$. Additionally, access to the set of child nodes may be distributed using a hash function. Thus, rather than having a single half-full node to accept insertions, a set of substantially empty nodes with distributed access is available. This facilitates cooling off a hot-spot.

Example methods may be better appreciated with reference to flow diagrams. While for purposes of simplicity of explanation, the illustrated methods are shown and described as a series of blocks, it is to be appreciated that the methods are not limited by the order of the blocks, as some blocks can occur in different orders and/or concurrently with other blocks from that shown and described. Moreover, less than all the illustrated blocks may be required to implement an example method. In some examples, blocks may be combined, separated into multiple components, may employ additional, not illustrated blocks, and so on. In some examples, blocks may be implemented in logic. In other examples, processing blocks may represent functions and/or actions performed by functionally equivalent circuits (e.g., an analog circuit, a digital signal processor circuit, an application specific integrated circuit (ASIC)), or other logic device. Blocks may represent executable instructions that cause a computer, processor, and/or logic device to respond, to perform an action(s), to change states, and/or to make decisions. While the figures illustrate various actions occurring in serial, it is to be appreciated that in some examples various actions could occur concurrently, substantially in parallel, and/or at substantially different points in time.

Figure 3:
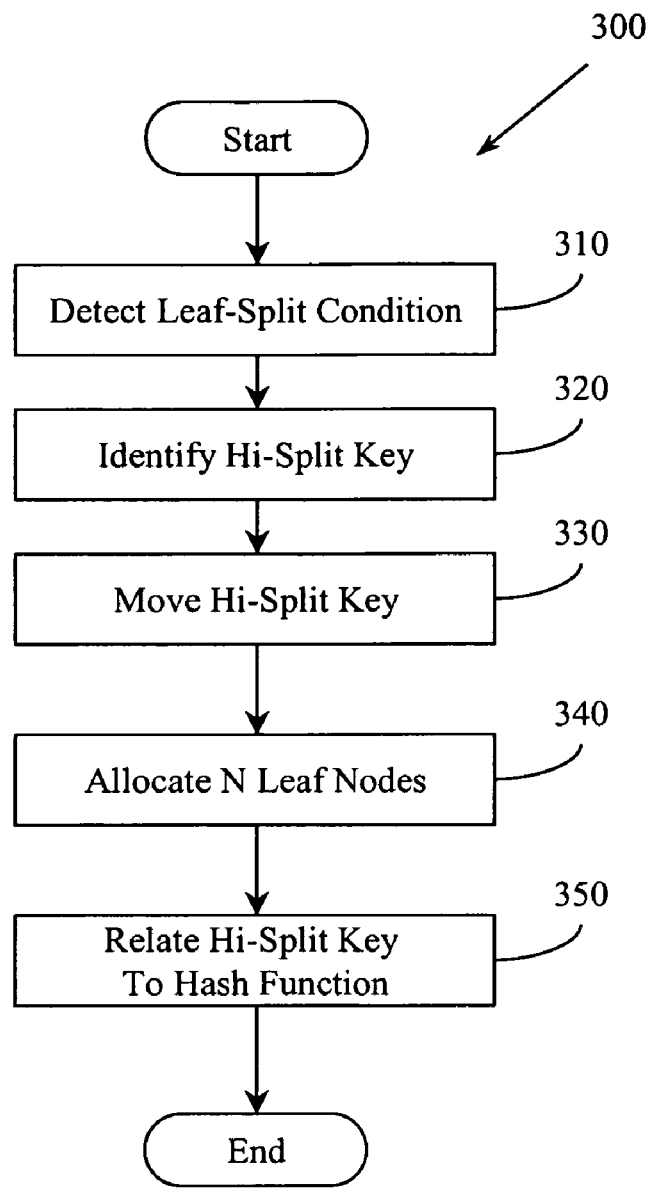
FIG. 3 illustrates an example method associated with a hi-split enabled b-tree.

FIG. 3 illustrates a method 300. Method 300 includes, at 310, detecting a leaf-split condition for a leaf node in a hi-split enabled b-tree. The b-tree may be, for example, a top-to-bottom balanced b-tree. Detecting the leaf-split condition may include, for example, identifying that a node stores more than a threshold number of keys. This may also be referred to as a node becoming "full".

Method 300 may also include, at 320, identifying a hi-split key in the leaf node. The location of the hi-split key may be determined, for example, by a user configured parameter. In different examples the hi-split key may be a last key in the leaf node, a next to last key in the leaf node, a first key in the leaf node, a second key in the leaf node, and so on. Thus, the hi-split key may facilitate providing insertion-rate responsiveness to right-most growing characteristic b-trees, leftmost growing characteristic b-trees, and so on.

Method 300 may also include, at 330, moving the hi-split key from the leaf node to a parent of the leaf node and, at 340, allocating n leaf nodes, n being an integer greater than one. In different examples, n may take on different values. For example, n may be three, five, ten, and so on. Allocating more than one leaf node facilitates reducing contention in a hot-spot by providing more locations and more blocks than are conventionally available for insertions. In one example, the n leafs nodes may be allocated from contiguous physical disk locations. This may facilitate, for example, performing a range scan on a b-tree where all n leaf nodes are read with a single input/output operation. More generally, pages of memory associated with the n leaf nodes may be allocated so that as many of the pages as possible belong to a contiguous region on a disk. In one example, all of the pages may belong to a contiguous region on a disk. Allocating pages in this way may facilitate reducing the number of input/output operations required to read in the pages associated with the n leaf nodes. In one example, it may only require a single i/o operation.

Method 300 may also include, at 350, relating the hi-split key to a hash function. The hash function may provide and control key-based access to the n leaf nodes. While n physical nodes are allocated, the hash function facilitates making the n leafs nodes appear and operate as a single logical leaf node. Thus actions like look-ups, ranging operations, and so on, may interact with the hi-split enabled b-tree. The hash function therefore may facilitate easing contention and "cooling off" a hot-spot. Reducing contention may include, for example, having the hash function distribute and control insertions to members of the n leaf nodes based on a key associated with the insertion. The hash function may similarly control lookups to members of the n leaf nodes based on a key associated with the lookup.

An addressing scheme applied to the set of keys associated with the set of n leaf nodes may facilitate distributing insertions and thus may facilitate reducing contention, cooling off a hot-spot, and so on. In one example, a locally linear but globally non-linear scheme may be used. For example, a subset of a set of keys associated with the n leaf nodes may be addressed sequentially within members of the n leaf nodes. However, the entire set of keys associated with the n leaf nodes may not be addressed sequentially across the n leaf nodes. In this way issues associated with a right/left most growing characteristic may be mitigated.

Method 300 may be employed in different settings. By way of illustration, method 300 may operate on a b-tree that is part of a cluster database. The cluster database may use a shared cache architecture. The cluster database may, for example, be a member of an enterprise grid having multiple cluster databases. To maintain consistency between the cluster databases, the enterprise grid may synchronize the cluster databases using a cluster interconnect.

Different applications may use method 300. By way of illustration, method 300 may operate on a b-tree that supports an online transaction processing (OLTP) system, a decision support system (DSS), and so on. While an OLTP and a DSS are described, it is to be appreciated that other applications may also interact with method 300 and/or a hi-split enabled b-tree that is insertion-rate sensitive.

While FIG. 3 illustrates various actions occurring in serial, it is to be appreciated that various actions illustrated in FIG. 3 could occur at least partially in parallel. By way of illustration, a first process could detect a leaf-split condition, a second process could identify and move a hi-split key, a third process could allocate n leaf nodes, and a fourth process could relate the hi-split key to the hash function to provide and control access to the n leaf nodes. While four processes are described, it is to be appreciated that a greater and/or lesser number of processes could be employed and that lightweight processes, regular processes, threads, and other approaches could be employed.

In one example, a method is implemented as processor executable instructions and/or operations. Thus, in one example, a machine-readable medium may store executable instructions that if executed by a machine (e.g., processor) may cause the machine to perform a method. The method may include detecting a leaf-split condition for a leaf node in a b-tree that is hi-split enabled and also detecting that an insertion rate associated with the leaf node exceeds an insertion threshold. The method may also include identifying a hi-split key in the leaf node and moving the hi-split key from the leaf node to a parent of the leaf node. The method may also include selectively allocating a set of leaf nodes, where the size of the set depends on the insertion rate. The method may also include relating the hi-split key to a hash function that provides and controls key-based access to the n leaf nodes, which makes the n leafs nodes operate as a single logical leaf node. While the above method is described being stored on a machine-readable medium, it is to be appreciated that other example methods described herein may also be stored on a machine-readable medium.

Figure 4:
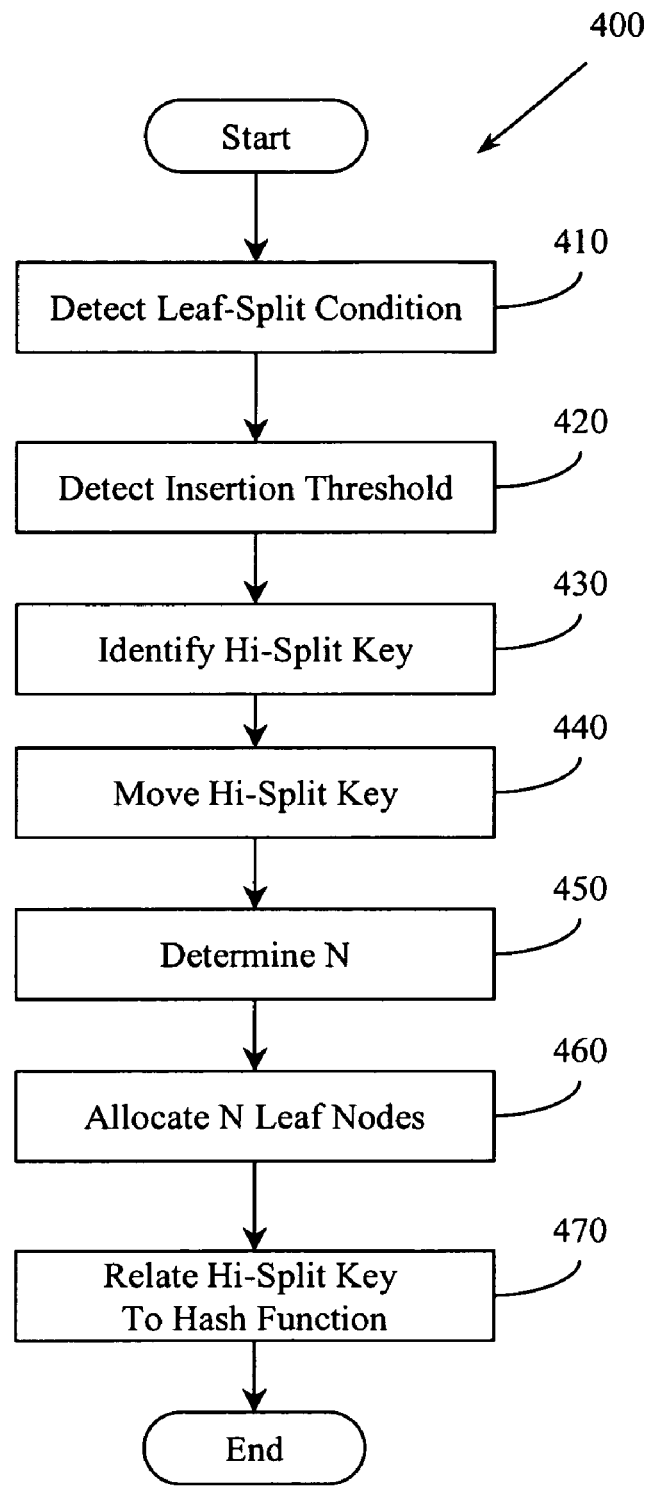
FIG. 4 illustrates an example method associated with a hi-split enabled b-tree.

FIG. 4 illustrates a method 400 associated with a hi-split enabled b-tree. Method 400 performs several actions similar to those described in connection with method 300 (FIG. 3). For example, method 400 includes detecting a leaf split condition at 410, identifying a hi-split key at 430, moving the hi-split key at 440, allocating multiple leaf nodes at 460, and relating the hi-split key to a hash function at 470. However, method 400 includes additional actions and may also allocate the multiple leaf nodes using a different approach.

Method 400 includes, at 420, detecting that an insertion rate associated with the leaf node exceeds an insertion threshold. The insertion threshold may be associated with a user configurable parameter that describes a condition a user wishes to address and/or prevent. For example, a user may decide that an insertion rate above a certain number of insertions per second indicates a hot-spot that needs to be cooled. Therefore, in different examples, the insertion threshold may be based on insertions per period of time, on a ratio of insertions to the leaf node versus insertions to the b-tree over a period of time, and so on. While insertions per second and a ratio of node insertions to overall insertions are described, it is to be appreciated that the insertion threshold may be based on other factors.

Under a first set of conditions a threshold may be exceeded by a first amount while under a second set of conditions a threshold may be exceeded by a second (e.g., greater) amount. Thus, method 400 includes, at 450, determining a value for n based on the amount (e.g., degree) by which the insertion rate associated with the leaf node exceeds the insertion threshold. For example, if the insertion rate is barely exceeded, n may be set to a smaller number (e.g., three) but if the insertion rate is significantly exceeded n may be set to a larger number (e.g., ten). While three and ten are described, it is to be appreciated that other values for n may be determined based on the degree to which an insertion threshold is exceeded. Additionally, in one example, n may have a binary quality. If the insertion threshold is exceeded, n may be a first number (e.g., ten) while if the insertion threshold is not exceed, n may be a second number (e.g., one).

Figure 5:
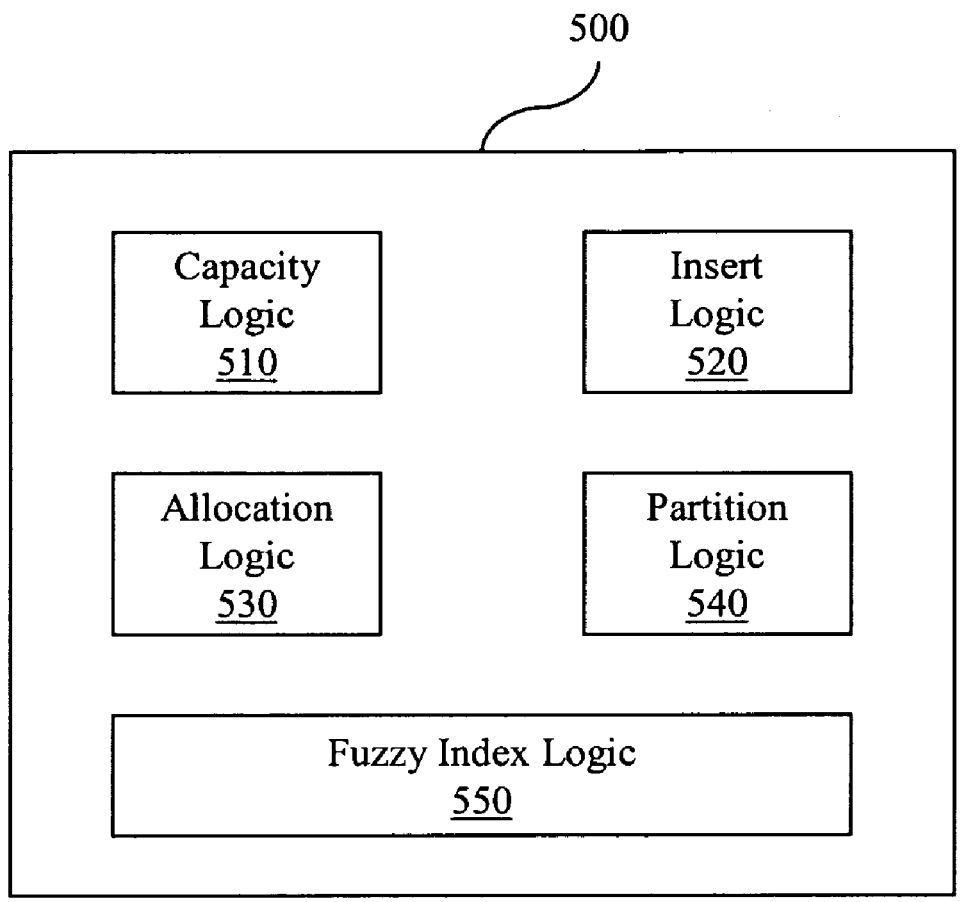
FIG. 5 illustrates an example system associated with an insertion rate aware b-tree.

FIG. 5 illustrates a system 500 associated with an insertion rate aware b-tree. In one embodiment, an insertion rate aware b-tree is a b-tree that can perform a hi-split for a node and that can allocate more than one new leaf for a node split. Thus, system 500 includes a capacity logic 510 to detect a divide condition for a leaf node in an insertion rate aware b-tree. The divide condition may occur when the leaf node becomes full. In one example, being "full" may be a user-defined condition (e.g., more than x % utilized).

System 500 may also include an insert logic 520 to determine an insertion level for the leaf node. The insertion level may be, for example, a count of insertions per period of time, a relative rate that describes how busy the leaf node is compared to other leaf nodes and/or the rest of the b-tree, and so on. In one example, the insertion level may be compared to a user defined and/or user configurable parameter to determine whether to perform a hi-split and/or an n-way split.

System 500 may also include an allocation logic 530 to selectively allocate a set of leaf nodes based on the divide condition and the insertion level. In one example, the allocation logic 530 may determine a split type and/or a number of members for the set of leaf nodes based on the insertion level. For example, if the insertion level is below a threshold value, then a normal split may be performed. The normal split may not be a hi-split and may result in only a single new leaf node being allocated. However, if the insertion level is above a threshold value, then a hi-split may be performed and a plurality of new leaf nodes may be allocated. By way of illustration, when a threshold is exceeded, five new leaf nodes may be allocated.

System 500 may also include a partition logic 540 to move a partition key from the leaf node to a parent of the leaf node. The partition logic 540 may also associate the partition key with the set of leaf nodes. Associating the partition key with the set of leaf nodes may include, for example, logically linking a hash function to the partition key so that accesses (e.g., lookups, insertions) to the set of leaf nodes are distributed and controlled by the hash function.

System 500 may also include a fuzzy index logic 550 to provide key-based addressing to an entry in the set of leaf nodes. In one example, the key-based addressing distributes addresses between members of the set of leaf nodes based on a hashing function applied to a key. By way of illustration, a key associated with a key/rowid pair may be processed by a hash function to produce a hash value. The hash value may identify one of the set of leaf nodes into which the key/rowid pair is to be inserted. In this way sequential keys, which are likely in certain OLTP applications, may be distributed between the set of leaf nodes and thus alleviate, for example, a rightmost growing condition.

Figure 6:
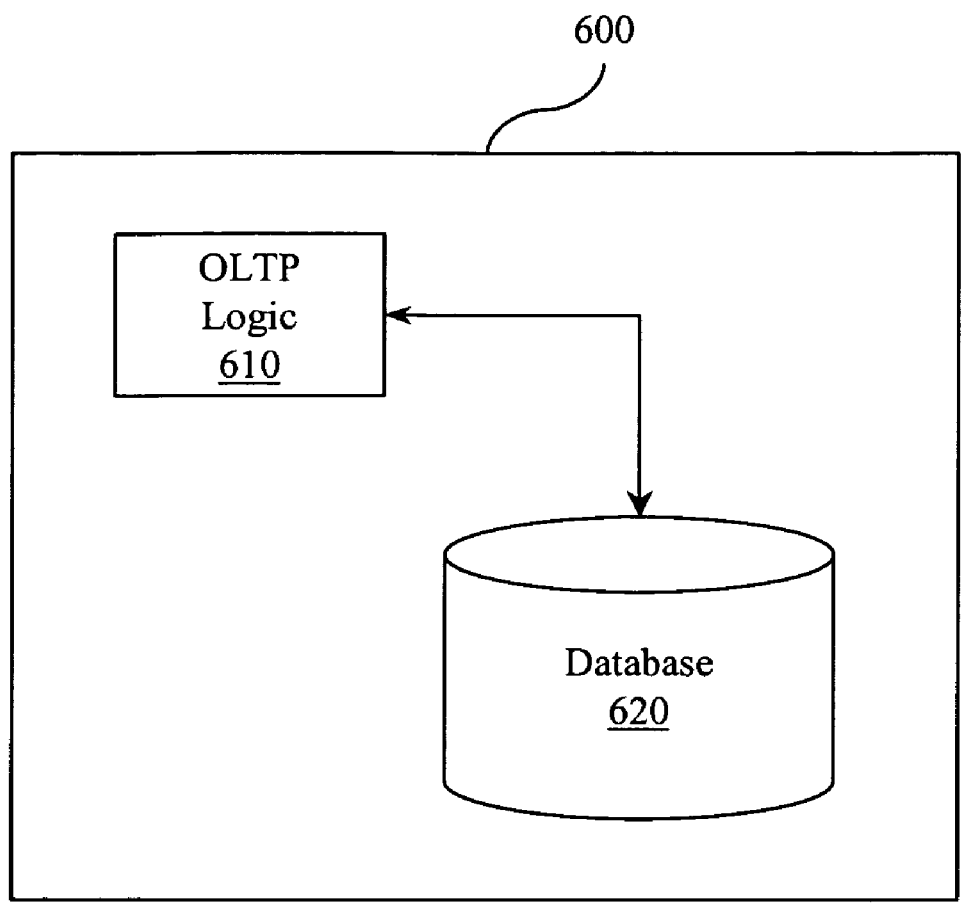
FIG. 6 illustrates an online transaction processing (OLTP) system.

FIG. 6 illustrates an online transaction processing (OLTP) system 600. The OLTP 600 may include an online transaction processing logic 610 and a database 620. The database 620 may include an insertion rate responsive b-tree. The OLTP system may, for example, process transactions with sequentially increasing identifiers. The identifiers may be used as keys for storing information about the transactions. Thus, data structures in the database 620 may experience a rightmost growing condition. Therefore, database 620 may include an insertion rate responsive b-tree like those described herein. The insertion rate responsive b-tree facilitates mitigating issues experienced by OLTP systems whose related data structures (e.g., trees) are exposed to conditions like the rightmost growing condition.

Figure 7:
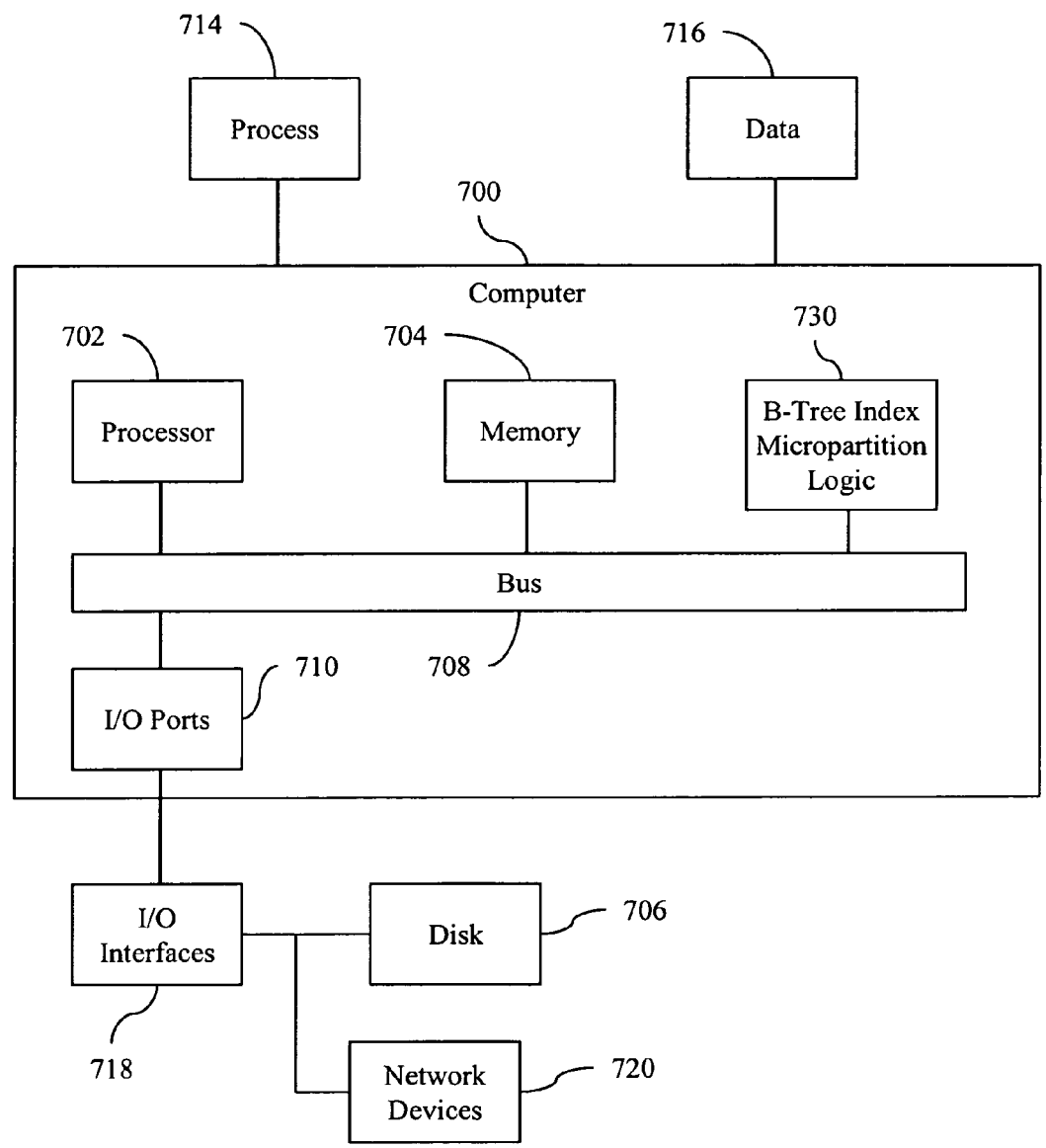
FIG. 7 illustrates an example computing environment in which example systems and methods illustrated herein may operate.

FIG. 7 illustrates an example computing device in which example systems and methods described herein, and equivalents, may operate. The example computing device may be a computer 700 that includes a processor 702, a memory 704, and input/output ports 710 operably connected by a bus 708. In one example, computer 700 may include a b-tree index micro-partition logic 730 to make a balanced b-tree responsive to insertion rate. In different examples, logic 730 may be implemented in hardware, software, firmware, and/or combinations thereof. Thus, logic 730 may provide means (e.g., hardware, software, firmware) for detecting a hot-spot in a b-tree, means (e.g., hardware, software, firmware) for micro-partitioning an index associated with the hot-spot, and means (e.g., hardware, software, firmware) for distributing insertions intended for the hot-spot using the micro-partitioned index. The means for detecting may receive information concerning an insertion rate for a leaf node and may receive information concerning the leaf split condition for the leaf node. The means for micro-partitioning may provide information concerning a type of split (e.g., normal, hi) to perform and a number of leafs to allocate in an n-way split. Thus, rather than engaging in a normal two-way partition, a leaf node may be split n-ways during a micro-partition. The means for distributing insertions may include, for example, a hash function logic for navigating the micro-partitioned index. While logic 730 is illustrated as a hardware component attached to bus 708, it is to be appreciated that in one example, logic 730 could be implemented in processor 702 and/or may be a process performed by processor 702.

Generally describing an example configuration of computer 700, processor 702 may be a variety of various processors including dual microprocessor and other multi-processor architectures. Memory 704 may include volatile memory and/or non-volatile memory. Non-volatile memory may include, for example, ROM (Read Only Memory), PROM (Programmable ROM), EPROM (Erasable PROM), and EEPROM (Electrically Erasable PROM). Volatile memory may include, for example, RAM (Random Access Memory), synchronous RAM (SRAM), dynamic RAM (DRAM), synchronous DRAM (SDRAM), double data rate SDRAM (DDR SDRAM), and direct RAM bus RAM (DRRAM).

Disk 706 may be operably connected to the computer 700 via, for example, an input/output interface (e.g., card, device) 718 and an input/output port 710. Disk 706 may be, for example, a magnetic disk drive, a solid state disk drive, a floppy disk drive, a tape drive, a Zip drive, a flash memory card, and/or a memory stick. Furthermore, disk 706 may be a CD-ROM (Compact Disk ROM), a CD recordable drive (CD-R drive), a CD rewriteable drive (CD-RW drive), and/or a digital video ROM drive (DVD ROM). Memory 704 can store processes 714 and/or data 716, for example. Disk 706 and/or memory 704 can store an operating system that controls and allocates resources for computer 700.

Bus 708 may be a single internal bus interconnect architecture and/or other bus or mesh architectures. While a single bus is illustrated, it is to be appreciated that computer 700 may communicate with various devices, logics, and peripherals using other busses (e.g., PCIE (PCI Express), USB (Universal Serial Bus), Ethernet). Bus 708 can be types including, for example, a memory bus, a memory controller, a peripheral bus, an external bus, a crossbar switch, and/or a local bus. The local bus may be, for example, an industrial standard architecture (ISA) bus, a microchannel architecture (MSA) bus, an extended ISA (EISA) bus, a peripheral component interconnect (PCI) bus, a USB bus, and a small computer systems interface (SCSI) bus.

Computer 700 may interact with input/output devices via i/o interfaces 718 and input/output ports 710. Input/output devices may be, for example, a keyboard, a microphone, a pointing and selection device, cameras, video cards, displays, disk 706, network devices 720, and so on. Input/output ports 710 may include, for example, serial ports, parallel ports, and USB ports.

Computer 700 can operate in a network environment and thus may be connected to network devices 720 via i/o interfaces 718, and/or i/o ports 710. Through the network devices 720, computer 700 may interact with a network. Through the network, computer 700 may be logically connected to remote computers. Networks with which computer 700 may interact include, but are not limited to, a local area network (LAN), a wide area network (WAN), and other networks. In different examples, network devices 720 may connect to LAN technologies including, for example, fiber distributed data interface (FDDI), copper distributed data interface (CDDI), Ethernet (IEEE 802.3), token ring (IEEE 802.5), wireless computer communication (IEEE 802.11), and Bluetooth (IEEE 802.15.1). Similarly, network devices 720 may connect to WAN technologies including, for example, point to point links, circuit switching networks (e.g., integrated services digital networks (ISDN)), packet switching networks, and digital subscriber lines (DSL).

Figure 8:
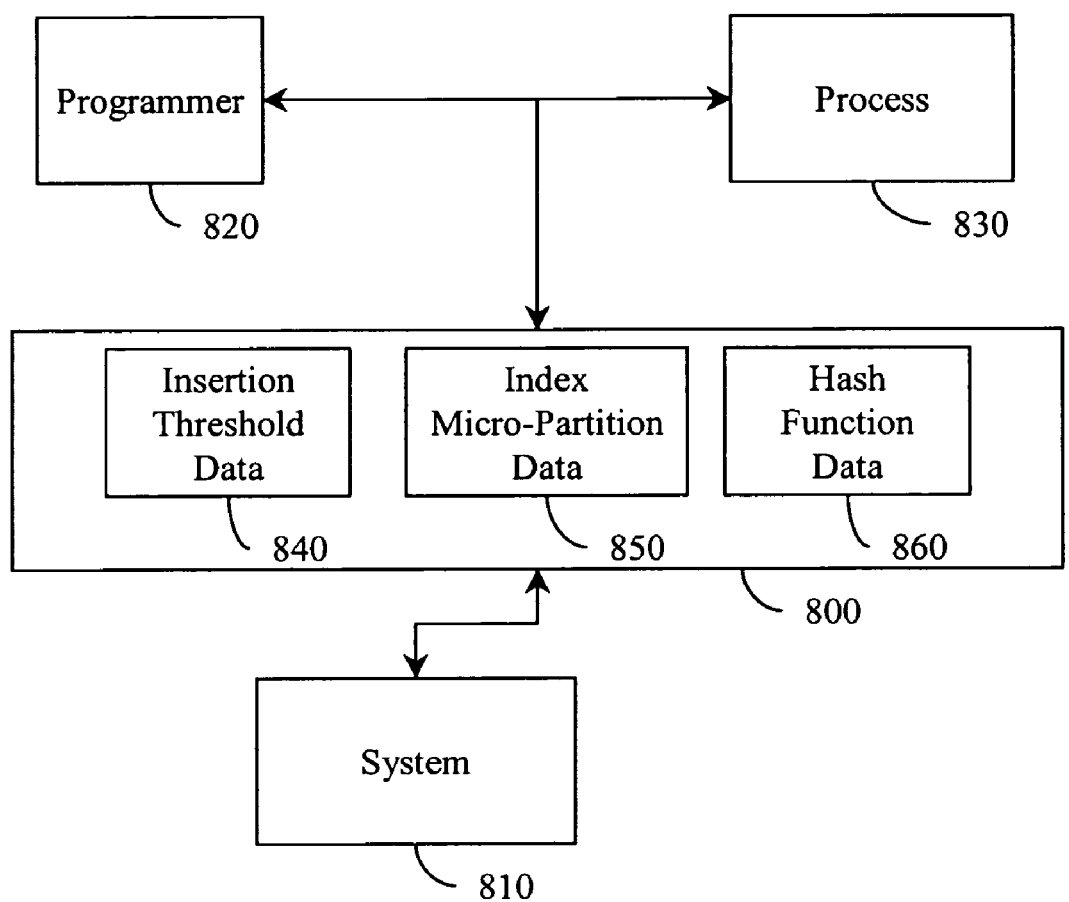
FIG. 8 illustrates an example application programming interface (API).

FIG. 8 illustrates an application programming interface (API) 800 that provides access to a system 810 that provides insertion-rate responsiveness for a b-tree. API 800 can be employed, for example, by a programmer 820 and/or a process 830 to gain access to processing performed by system 810 and/or a functionally equivalent method. For example, programmer 820 can write a program to access system 810 (e.g., invoke its operation, monitor its operation, control its operation) where writing the program is facilitated by the presence of API 800. Rather than programmer 820 having to understand the internals of system 810, programmer 820 merely has to learn the interface to system 810. This facilitates encapsulating the functionality of system 810 while exposing that functionality. In one example, an API 800 can be stored on a machine-readable medium.

Interfaces in API 800 can include, but are not limited to, a first interface 840 that communicates an insertion threshold data, a second interface 850 that communicates an index micro-partition data, and a third interface 860 that communicates a hash function data. The insertion threshold data may describe, for example, conditions that control whether a two-way split or an n-way split is performed. The micro-partition data may provide, for example, information concerning block addresses for blocks allocated in an n-way split. The hash function data may describe, for example, a hash function entry point, hash function parameters, and so on.

In one example, data structures and/or methods may be stored on a machine-readable medium and/or in a data store. Thus, in one example, a machine-readable medium may store an object. In computer science, an object is a single logical entity that includes a set of data structures and a set of methods for interacting with the set of data structures. The data structures may expose public data and may hide private data.

Figure 9:
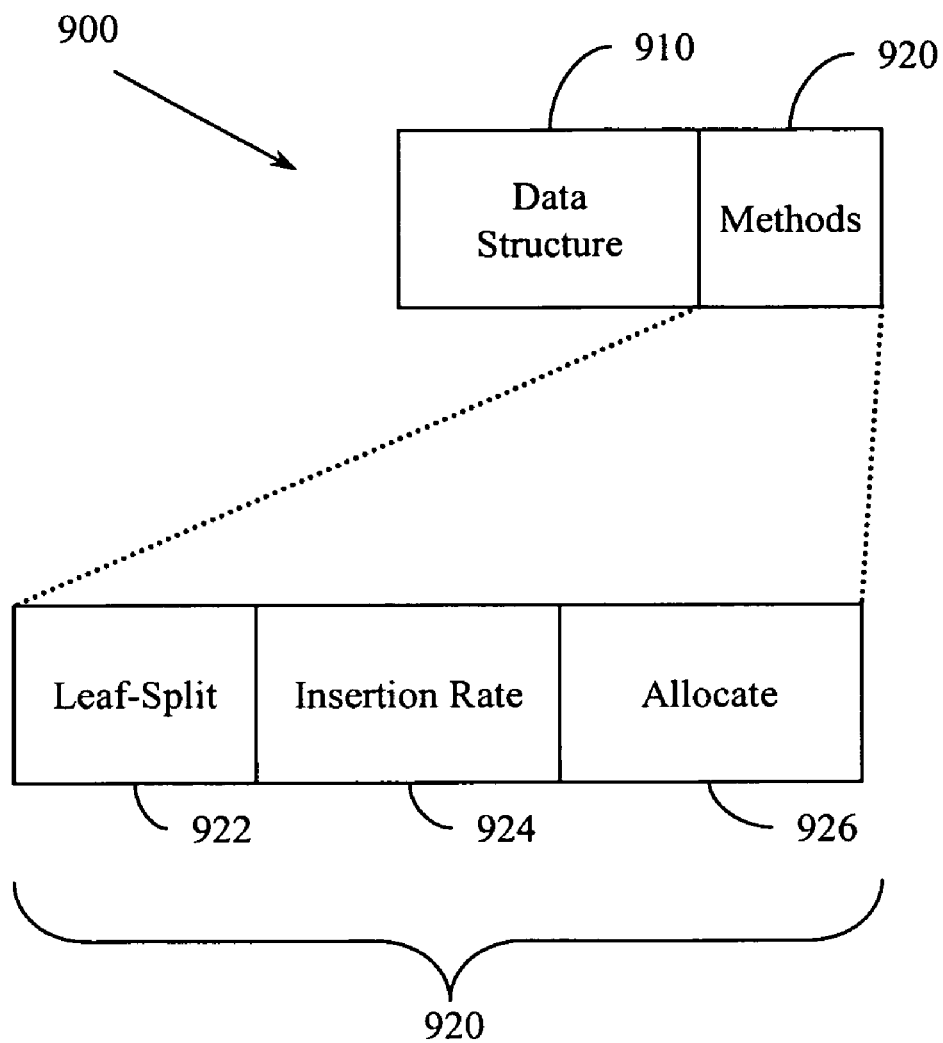
FIG. 9 illustrates an object stored on a machine-readable medium.

FIG. 9 illustrates an object 900 stored on a machine-readable medium. In one embodiment, the machine-readable medium will store a balanced b-tree data structure 910 that is insertion rate responsive. The machine-readable medium will also store a set 920 of methods for manipulating and/or interacting with the balanced b-tree data structure. The set 920 of methods may include, for example, a method 922 to detect a leaf-split, a method 924 to determine an insertion rate, and a method 926 to selectively allocate a set of leaf nodes for the leaf split. Characteristics of the set of nodes that will be allocated may depend, at least in part, on the insertion rate. For example, a first lower insertion rate may lead to a first lower number of leaf nodes in the set while a second higher insertion rate may lead to a second higher number of leaf nodes in the set.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". The term "and/or" is used in the same manner, meaning "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A computer-implemented method, comprising:
    detecting, using at least a processor, a split condition for a node in a b-tree, where the b-tree is a data structure stored in a machine-readable medium;

identifying a hi-split key in the node, where the hi-split key partitions the node into two unequal portions such that one portion contains a greater number of keys than the other portion;

moving the hi-split key from the node to the parent node of the node;

splitting the node by allocating n additional leaf nodes at the same level as the node, the n additional leaf nodes being child nodes of the parent node containing the hi-split key, where n is an integer greater than one; and relating the hi-split key to a hash function configured:
to provide key-based access to the n additional leaf nodes;
to control key-based access to the n additional leaf nodes, and
to make the n additional leaf nodes operate as a single logical leaf node.

2. The method of claim 1, including detecting that an insertion rate associated with the node exceeds an insertion threshold.

3. The method of claim 2, the insertion threshold being based on insertions per period of time.

4. The method of claim 2, the insertion threshold being based on a ratio of insertions to the node versus insertions to the b-tree, the ratio being measured over a period of time.

5. The method of claim 2, where n depends on an amount by which the insertion rate exceeds the insertion threshold.

6. The method of claim 1, the hi-split key being one of, a last key in the node, a next to last key in the node, a first key in the node, and a second key in the node.

7. The method of claim 1, the hash function being configured to control an insertion to a member of the n additional leaf nodes based, at least in part, on a key associated with the insertion.

8. The method of claim 7, the hash function being configured to control a lookup to a member of the n additional leaf nodes based, at least in part, on a key associated with the lookup.

9. The method of claim 1, including allocating the n additional leaf nodes from contiguous physical disk locations.

10. The method of claim 1, where a subset of a set of keys associated with the n additional leaf nodes is addressed sequentially in a member of the n additional leaf nodes and where the set of keys associated with the n additional leaf nodes is not addressed sequentially across the n additional leaf nodes.

11. The method of claim 1, the b-tree being an element in a cluster database configured in a shared cache architecture.

12. The method of claim 11, the cluster database being a member of an enterprise grid having two or more cluster databases.

13. The method of claim 12, the enterprise grid being configured to synchronize cluster databases using a cluster interconnect.

14. The method of claim 12, comprising detecting that an insertion rate associated with the node exceeds an insertion threshold, where the cluster database supports one or more of, an online transaction processing (OLTP) system, and a decision support system (DSS).

15. A computer-implemented method, comprising:
detecting, using at least a processor, a split condition for a node in a b-tree, where the b-tree is stored on a non-transitory machine-readable medium;
detecting, using at least the processor, that an insertion rate associated with the node exceeds a hi-split insertion threshold, the hi-split insertion threshold being based on one or more of, insertions per period of time, and a ratio of insertions to the node versus insertions to the b-tree, the ratio being measured over a period of time;
identifying a hi-split key in the node, where the hi-split key partitions the node into two unequal portions such that one portion contains a greater number of keys than the other portion;
moving the hi-split key from the node to the parent node of the node;
splitting the node by allocating n additional leaf nodes at the same level as the node, the n additional leaf nodes being child nodes of the parent node containing the hi-split key, where n is an integer greater than one and where n depends on an amount by which the insertion rate exceeds the insertion threshold; and
relating the hi-split key to a hash function, the hash function being configured to provide key-based access to the n additional leaf nodes, to control key-based access to the n additional leaf nodes to make the n additional leaf nodes operate as a single logical leaf node, to control an insertion to a member of the n additional leaf nodes based, at least in part, on a key associated with the insertion, and to control a lookup to a member of the n additional leaf nodes based, at least in part, on a key associated with the lookup.

16. A non-transitory machine-readable medium having stored thereon machine-executable instructions that if executed by a machine cause the machine to perform a method, the method comprising:
detecting a split condition for a node in a b-tree;
detecting that an insertion rate associated with the node exceeds an insertion threshold;
identifying a hi-split key in the node, where the hi-split key partitions the node into two unequal portions such that one portion contains a greater number of keys than the other portion;
moving the hi-split key from the leaf to the parent node of the node;
splitting the node by allocating n additional leaf nodes at the same level as the node, the n additional leaf nodes being child nodes of the parent node containing the hi-split key, where n is an integer greater than one; and
relating the hi-split key to a hash function to:
provide key-based access to the n additional leaf nodes;
control key-based access to the n additional leaf nodes, and
make the n additional leaf nodes operate as a single logical leaf node.

17. A non-transitory machine-readable medium having stored thereon an object, the object comprising:
a balanced b-tree data structure configured to be insertion rate responsive; and
a set of methods for manipulating the balanced b-tree data structure, the set of methods including:
a first method to detect a split condition for a node;
a second method to determine an insertion rate; and
a third method to selectively split the node by allocating a set of n additional leaf nodes, where n is greater than one and depends, at least in part, on the insertion rate.

18. A system, comprising:
a capacity logic, embodied as machine-executable instructions stored on non-transitory machine-readable medium, configured to detect a divide condition for a node in a b-tree;
an insert logic, embodied as machine-executable instructions stored on non-transitory machine-readable medium, configured to insert a set of n additional leaf nodes, where n is greater than one and is selected based, at least in part, on an insertion rate at which data is being inserted into the node;

an allocation logic, embodied as machine-executable instructions stored on non-transitory machine-readable medium, configured to selectively allocate the set of additional leaf nodes based, at least in part, on the insertion rate;

a partition logic, embodied as machine-executable instructions stored on non-transitory machine-readable medium, configured to move a partition key from the node to the parent node of the node, and to associate the partition key with the set of additional leaf nodes; and a fuzzy index logic, embodied as machine-executable instructions stored on non-transitory machine-readable medium, configured to provide hash-based addressing to an entry in the set of additional leaf nodes.

19. The system of claim 18, where the insertion level describes one or more of, a rate of insertions to the node, and a relative rate of insertions to the node, and where the allocation logic is configured to determine a number of members for the set of additional leaf nodes based, at least in part, on the insertion level.

20. The system of claim 18, where the allocation logic is configured to determine a split-type based, at least in part, on the insertion rate and
where the fuzzy index logic is configured to distribute one or more addresses between the additional leaf nodes based, at least in part, on a hashing function applied to a key.

21. The method of claim 1, where the n additional leaf nodes are empty.

* * * * *

UNITED STATES PATENT AND TRADEMARK OFFICE
CERTIFICATE OF CORRECTION

PATENT NO. : 8,204,912 B2
APPLICATION NO. : 11/517686
DATED : June 19, 2012
INVENTOR(S) : Bamford et al.

Page 1 of 1

It is certified that error appears in the above-identified patent and that said Letters Patent is hereby corrected as shown below:

In column 2, line 67, delete "tapes." and insert -- tapes, --, therefor.

In column 3, line 63-64, delete "servelet," and insert -- servlet, --, therefor.

In column 9, line 28, delete "(MSA)" and insert -- (MCA) --, therefor.

Signed and Sealed this
Twenty-eighth Day of August, 2012

David J. Kappos
*Director of the United States Patent and Trademark Office*